United States Patent
Sugiyama et al.

(10) Patent No.: US 10,797,526 B2
(45) Date of Patent: Oct. 6, 2020

(54) POWER RECEPTION DEVICE AND WIRELESS POWER TRANSMISSION SYSTEM INCLUDING THE SAME

(71) Applicant: Toyota Jidosha Kabushiki Kaisha, Toyota-shi, Aichi-ken (JP)

(72) Inventors: Yoshinobu Sugiyama, Toyota (JP); Satoshi Taniguchi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 151 days.

(21) Appl. No.: 16/193,631

(22) Filed: Nov. 16, 2018

(65) Prior Publication Data
US 2019/0157907 A1    May 23, 2019

(30) Foreign Application Priority Data
Nov. 20, 2017    (JP) .................. 2017-222690

(51) Int. Cl.
| | | |
|---|---|---|
| H02J 50/12 | (2016.01) | |
| H02H 7/122 | (2006.01) | |
| H02H 1/00 | (2006.01) | |
| H02M 7/217 | (2006.01) | |
| B60L 53/12 | (2019.01) | |
| H02J 50/80 | (2016.01) | |
| H02J 7/02 | (2016.01) | |
| B60L 3/00 | (2019.01) | |
| B60L 53/66 | (2019.01) | |
| H02M 1/12 | (2006.01) | |

(52) U.S. Cl.
CPC .............. *H02J 50/12* (2016.02); *B60L 3/00* (2013.01); *B60L 53/12* (2019.02); *B60L 53/66* (2019.02); *H02H 1/0007* (2013.01); *H02H 7/1225* (2013.01); *H02J 7/022* (2013.01); *H02J 7/025* (2013.01); *H02J 50/80* (2016.02); *H02M 7/217* (2013.01); *H02M 1/126* (2013.01)

(58) Field of Classification Search
USPC ............................................. 307/104
See application file for complete search history.

(56) References Cited

U.S. PATENT DOCUMENTS

| | | | |
|---|---|---|---|
| 2013/0127409 A1 | 5/2013 | Ichikawa | |
| 2013/0193749 A1 | 8/2013 | Nakamura et al. | |
| 2019/0149053 A1* | 5/2019 | Bala | H02M 7/4807 320/107 |

FOREIGN PATENT DOCUMENTS

| | | |
|---|---|---|
| JP | 2013-110822 A | 6/2013 |
| JP | 2013-126327 A | 6/2013 |

(Continued)

*Primary Examiner* — Joseph Chang
(74) *Attorney, Agent, or Firm* — Dinsmore & Shohl LLP

(57) ABSTRACT

A crowbar circuit includes a diode bridge and switching elements, and is configured to rectify the full wave of AC power between the power lines and output the rectified AC power to a positive electrode line and a negative electrode line. A capacitor is connected between the power line and the negative electrode line. When a detection value of a current sensor indicates that the power reception device is not receiving power normally, a charging ECU stops the power conversion operation of the power transmission device, and thereafter outputs at least one of short circuit commands to the crowbar circuit so as to determine whether or not a malfunction is present in the crowbar circuit based on a detection value of the voltage sensor.

9 Claims, 11 Drawing Sheets

(56) References Cited

FOREIGN PATENT DOCUMENTS

| JP | 2013-146148 A | 7/2013 |
|----|---------------|--------|
| JP | 2013-146154 A | 7/2013 |
| JP | 2013-154815 A | 8/2013 |
| JP | 2014-207795 A | 10/2014 |
| JP | 2017-099097 A | 6/2017 |
| WO | 2013/108108 A2 | 7/2013 |

* cited by examiner

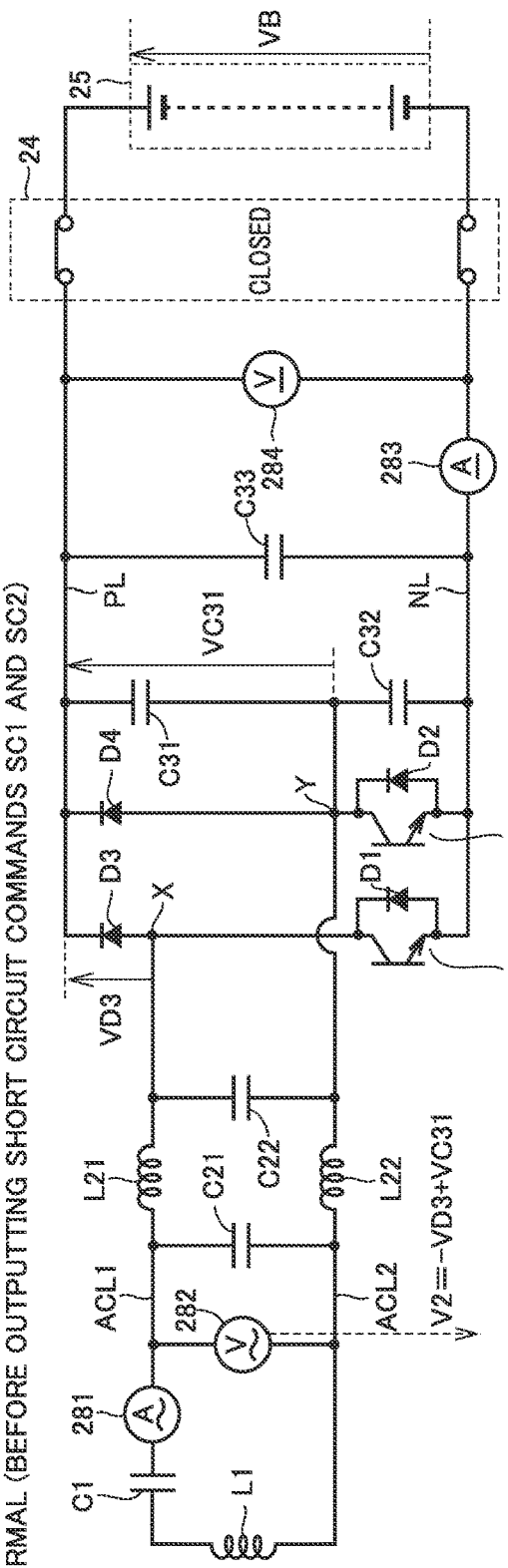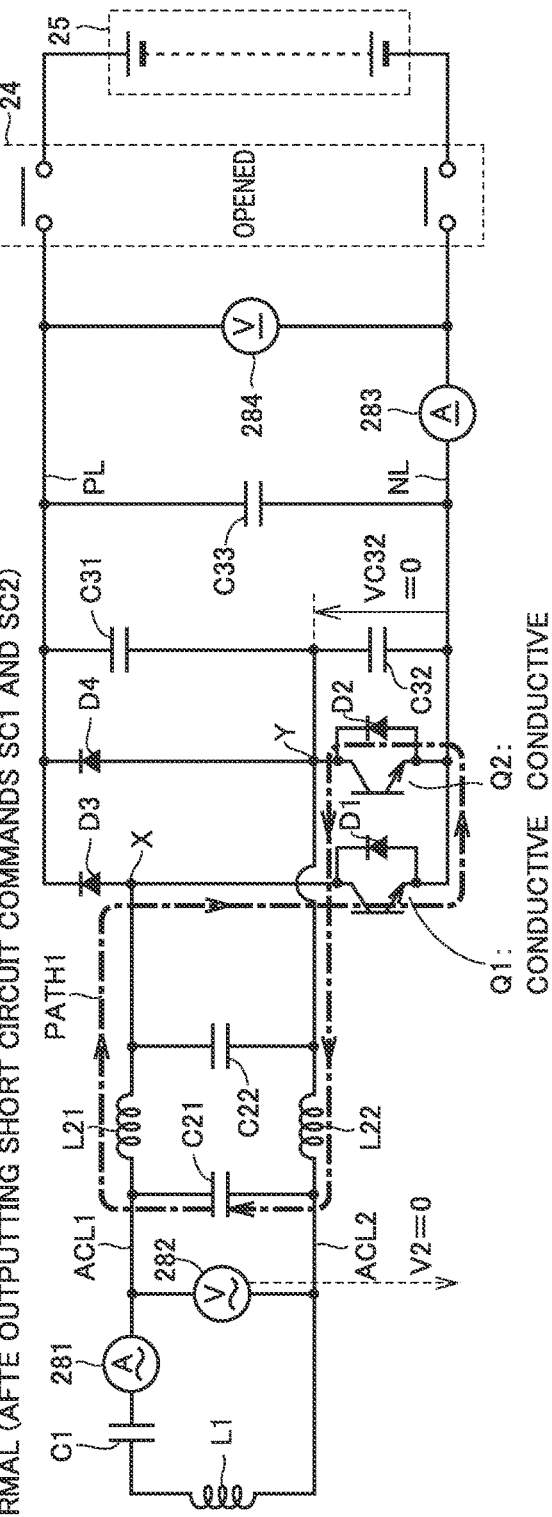
FIG.4(A) NORMAL (BEFORE OUTPUTTING SHORT CIRCUIT COMMANDS SC1 AND SC2)
FIG.4(B) NORMAL (AFTE OUTPUTTING SHORT CIRCUIT COMMANDS SC1 AND SC2)

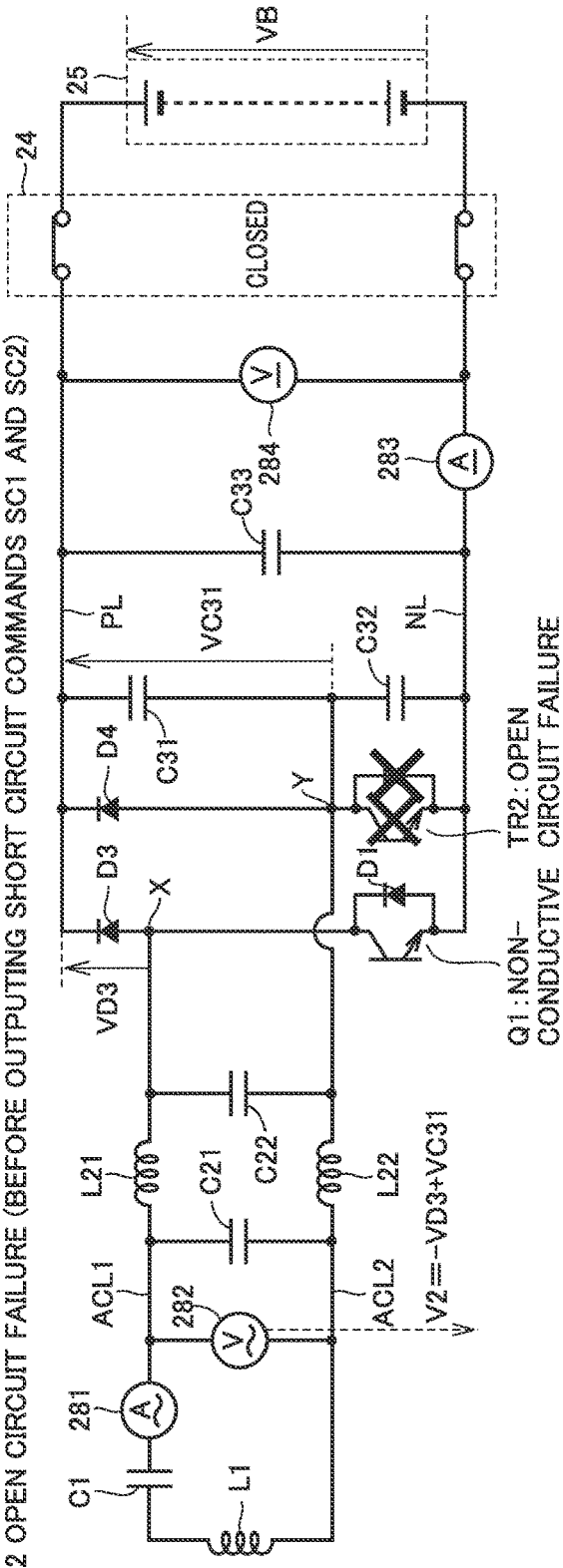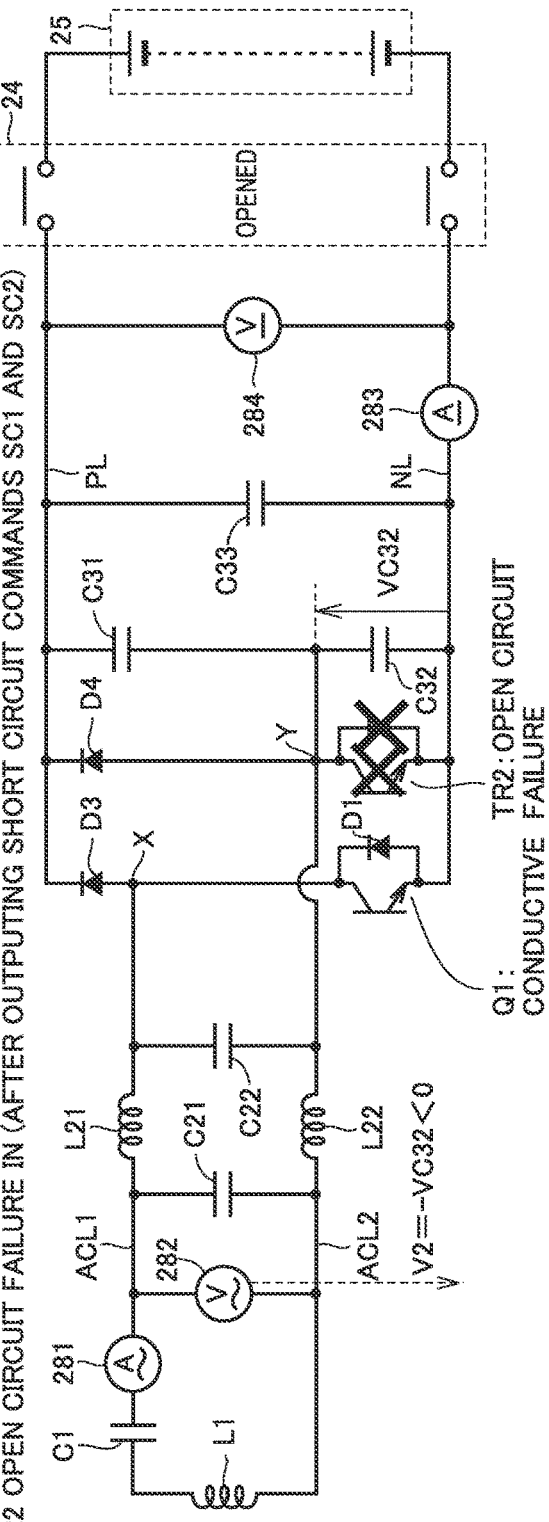

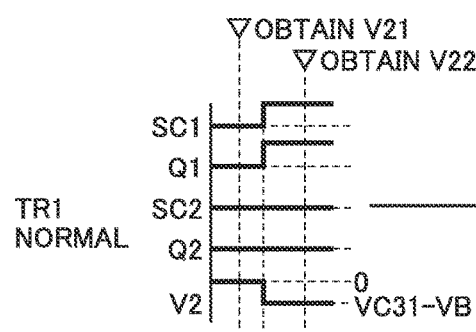
FIG.7(A) TR1 NORMAL
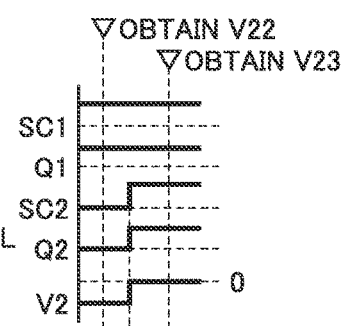
FIG.7(E) TR2 NORMAL
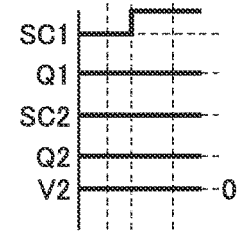
FIG.7(B) TR1 OPEN CIRCUIT FAILURE
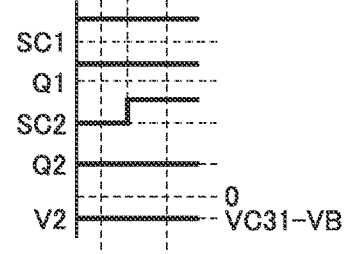
FIG.7(F) TR2 OPEN CIRCUIT FAILURE
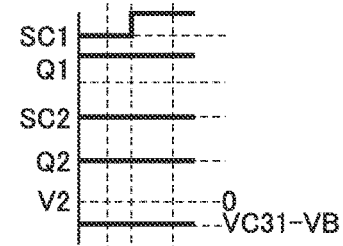
FIG.7(C) TR1 SHORT CIRCUIT FAILURE
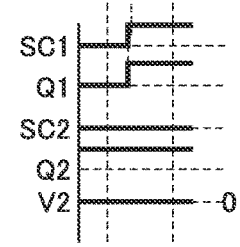
FIG.7(D) TR2 SHORT CIRCUIT FAILURE

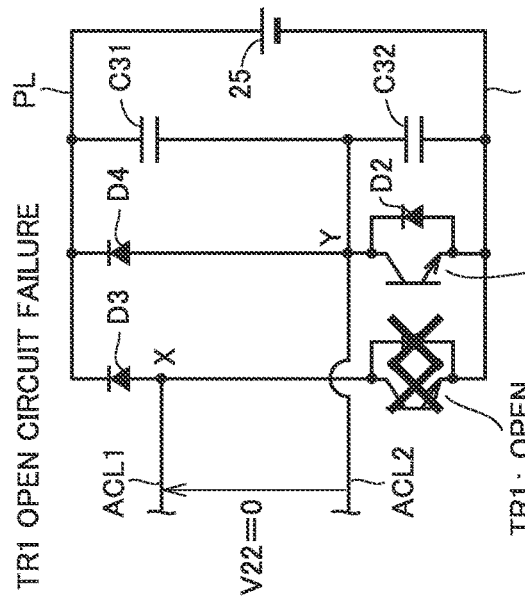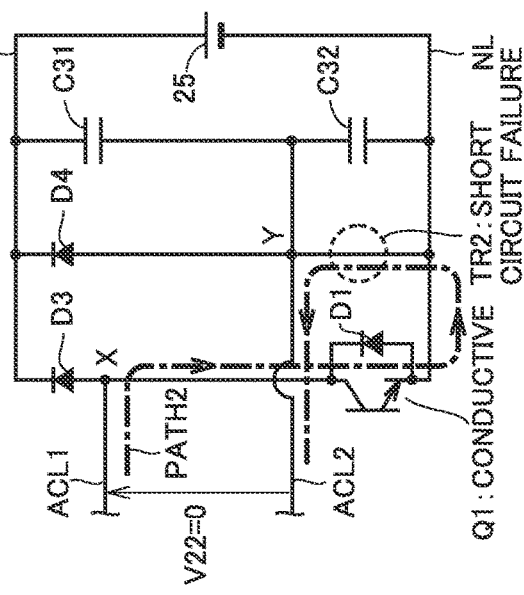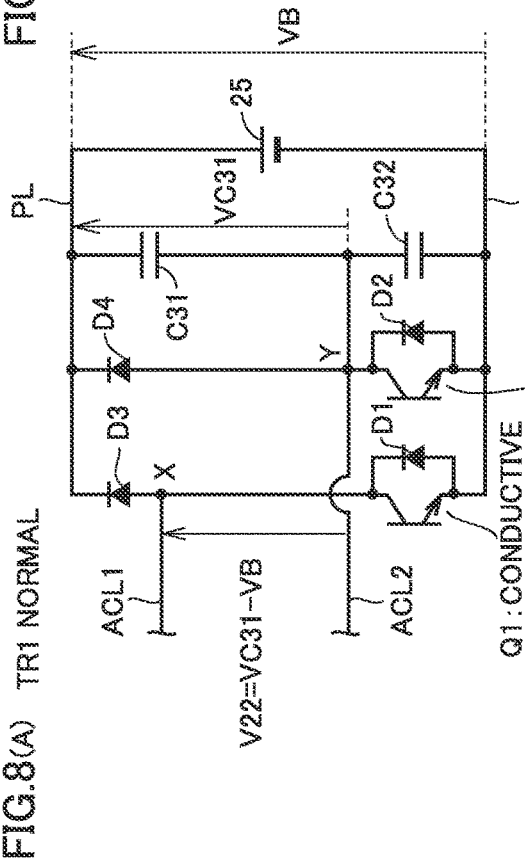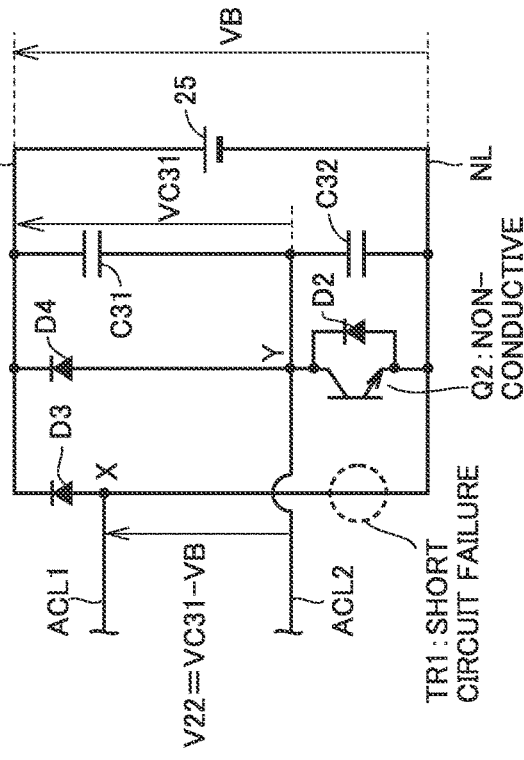
FIG.8(A)  TR1 NORMAL
FIG.8(B)  TR1 OPEN CIRCUIT FAILURE
FIG.8(C)  TR1 SHORT CIRCUIT FAILURE
FIG.8(D)  TR2 SHORT CIRCUIT FAILURE

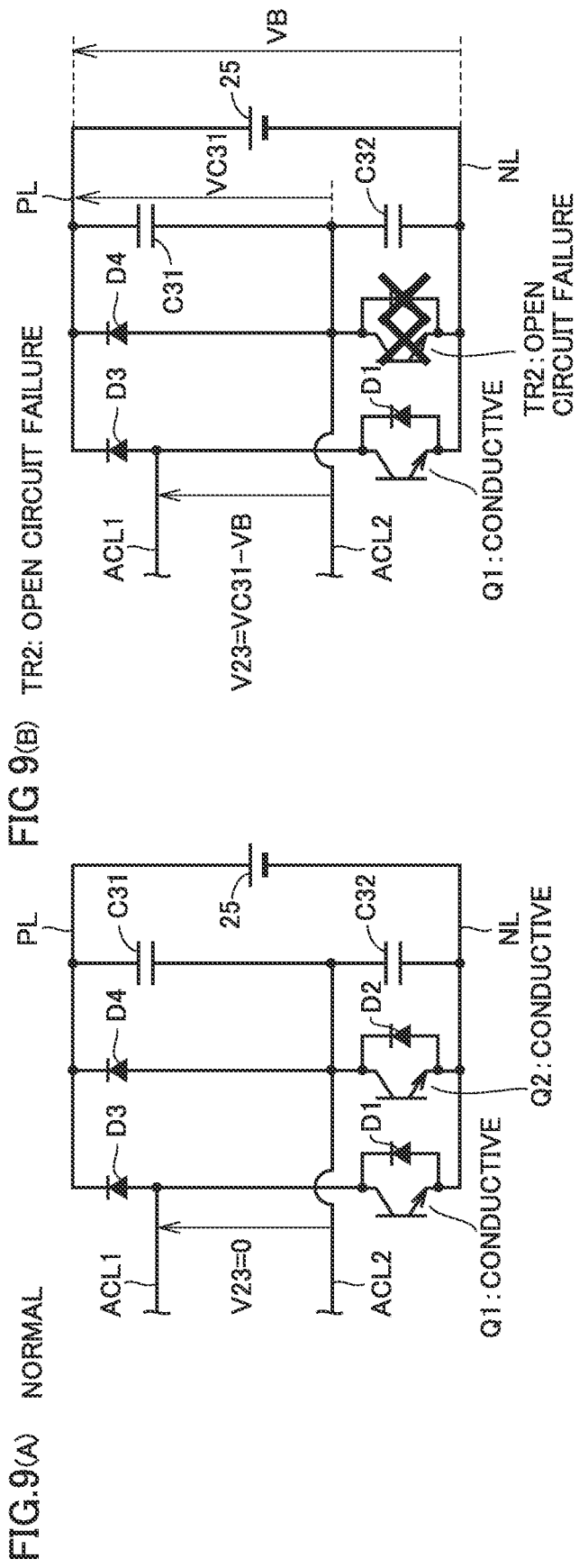

FIG.11

|  | V22 | | |
|---|---|---|---|
| V21 | | 0 | VC31−VB<0 |
| | 0 | TR1 OPEN CIRCUIT FAILURE OR TR2 SHORT CIRCUIT FAILURE | TR1 NORMAL |
| | VC31−VB<0 | — | TR1 SHORT CIRCUIT FAILURE |

POWER RECEPTION DEVICE AND WIRELESS POWER TRANSMISSION SYSTEM INCLUDING THE SAME

CROSS-REFERENCE TO RELATED APPLICATIONS

This non-provisional application claims priority to Japanese Patent Application 2017-222690 filed on Nov. 20, 2017 with the Japan Patent Office, the entire contents of which are hereby incorporated by reference.

BACKGROUND

Field

The present disclosure relates to a power reception device and a wireless power transmission system including the power reception device, and more specifically, to a technique for detecting a malfunction in a wireless power transmission system.

Description of the Background Art

A wireless power transmission system that transmits electric power in a wireless non-contact manner from a power transmission device to a power reception device is known (for example, see Japanese Patent Laying-Open Nos. 2017-099097, 2014-207795, 2013-154815, 2013-146154, 2013-146148, 2013-110822, and 2013-126327). For example, Japanese Patent Laying-Open No. 2017-099097 discloses a wireless power transmission system that transmits electric power in a wireless manner from a power transmission device to a power reception device mounted on a vehicle. In the wireless power transmission system, the power reception device is provided with a short circuit called a crowbar circuit so as to prevent its components from experiencing overvoltage.

As the crowbar circuit is activated (i.e., the switching elements included in the crowbar circuit are made conductive), the impedance of the power reception device decreases. In the wireless power transmission system disclosed in Japanese Patent Laying-Open No. 2017-099097, the resonance frequency of a resonance circuit which is disposed in the power reception unit and includes a power reception coil and a capacitor is estimated based on the phenomenon (for example, see paragraph [0071] in Japanese Patent Laying-Open No. 2017-099097).

SUMMARY

The crowbar circuit includes a diode bridge implemented by four diodes; and two switching elements. Each switching element is connected in parallel to a corresponding diode of the four diodes (the detailed configuration of the circuit will be described in later).

In the crowbar circuit having such a configuration, a malfunction (a short circuit failure or an open circuit failure) may occur in the switching elements and the diodes, which may prevent the power transmission from being performed normally. If the power reception device is mounted on an electric vehicle, the power storage device of the electric vehicle may not be charged normally.

By monitoring the detection value of a voltage sensor or a current sensor, it is possible to detect whether or not a malfunction is present in the wireless power transmission system. However, sometimes it is difficult to determine the cause of a malfunction in the crowbar circuit, in other words, it is difficult to determine the malfunction spot where a malfunction occurs. Thus, a repair technician will have to take a long time to repair the wireless power transmission system, or the repair technician may simply replace the entire system but it will cost a lot.

The present disclosure has been made to solve the above-described problems, and its object is to provide a wireless power transmission system that transmits power from a power transmission device to a power reception device in a wireless manner and a technique capable of determining immediately the spot of a malfunction in a crowbar circuit.

(1) A power reception device according to an aspect of the present disclosure is configured to receive power transmitted from a power transmission device configured to perform power conversion operation in a wireless manner. The power reception device includes a first capacitor, a voltage sensor, a current sensor, a crowbar circuit (rectifier circuit), a second capacitor, and a controller. The first capacitor is electrically connected between a first power line and a second power line connected respectively to both ends of a power reception coil that receives power from the power transmission device. The voltage sensor is configured to detect a voltage of the first power line with respect to the second power line. The current sensor is configured to detect a current flowing through one of the first power line and the second power line. The crowbar circuit includes a diode bridge which is implemented by a first diode, a second diode, a third diode and a fourth diode as well as a first switching element and a second switching element, and is configured to rectify the full wave of AC power between the first power line and the second power line and output the rectified AC power to a positive electrode line and a negative electrode line. The second capacitor is electrically connected between the second power line and the negative electrode line. The controller is configured to output a first control signal for making the first switching element conductive and a second control signal for making the second switching element conductive.

The first diode has an anode connected to the negative electrode line and a cathode connected to the first power line. The second diode has an anode connected to the negative electrode line and a cathode connected to the second power line. The third diode has an anode connected to the first power line and a cathode connected to the positive electrode line. The fourth diode has an anode connected to the second power line and a cathode connected to the positive electrode line. The first switching element is connected in parallel to the first diode. The second switching element is connected in parallel to the second diode.

In the case where a detection value of the current sensor indicates that the power reception device is not receiving power normally even though the power conversion operation of the power transmission device is being performed, the controller is configured to output at least one of the first control signal and second control signal to the crowbar circuit after stopping the power conversion operation of the power transmission device so as to determine whether or not a malfunction is present in the crowbar circuit based on a detection value of the voltage sensor.

(2) The power reception device further includes a relay circuit. The relay circuit is connected between the crowbar circuit and a power storage device for storing electric power rectified by the crowbar circuit, and is configured to be switched so as to electrically connect and disconnect the crowbar circuit and the power storage device. When the crowbar circuit and the power storage device are electrically disconnected from each other by the relay circuit, the controller is configured to output the first control signal and the second control signal, and determine that a malfunction is present in the crowbar circuit when the detection value of the voltage sensor is a negative value.

(3) The controller is configured to determine that the malfunction in the crowbar circuit is an open circuit failure (open mode failure) in both the second switching element and the second diode.

According to the configurations (1) to (3) described above, when the second switching element and the second diode are normal, the first switching element and the second switching element are made conductive in response to the first control signal and the second control signal, respectively. As a result, the first power line and the second power line are short-circuited, and the second power line and the negative electrode line are short-circuited. Thereby, the electric charges stored in the first capacitor and the second capacitor are discharged. As a result, the detection value of the voltage sensor becomes substantially 0. On the other hand, when an open circuit failure is present in the second switching element and the second diode, the second switching element does not respond to the control signal, the second power line and the negative electrode line are not short-circuited, and thus, the electric charges remain in the second capacitor. Therefore, the voltage of the second capacitor detected by the voltage sensor is not 0. Therefore, it is possible to determine whether or not an open circuit failure is present in the second switching element and the second diode occurs based on the detection value of the voltage sensor, and thereby it is possible to immediately determine that the spot of the open circuit failure is in the second switching element and the second diode.

(4) The power reception device further includes a relay circuit. The relay circuit is connected between the crowbar circuit and a power storage device for storing electric power rectified by the crowbar circuit, and is configured to be switched so as to electrically connect and disconnect the crowbar circuit and the power storage device. When the crowbar circuit and the power storage device are electrically connected to each other by the relay circuit, the controller is configured to obtain a first voltage which is a detection value of the voltage sensor under a condition that the first control signal and the second control signal are not outputted, and a second voltage which is a detection value of the voltage sensor under a condition that the first control signal is outputted and the second control signal is not outputted. The controller is configured to determine whether or not a malfunction is present in the crowbar circuit by comparing the first voltage and the second voltage.

(5) The controller is configured to determine whether the malfunction in the crowbar circuit is a first malfunction or a second malfunction based on the comparison result between the first voltage and the second voltage. The first malfunction is an open circuit failure in the first switching element and the first diode or a short circuit failure (short mode failure) in at least one of the second switching element and the second diode, and the second malfunction is a short circuit failure in at least one of the first switching element and the first diode.

(6) The controller is further configured to obtain a third voltage which is a detection value of the voltage sensor under a condition that both the first control signal and the second control signal are outputted. The controller is configured to determine whether or not an open circuit failure is present in the second switching element and the second diode by comparing the second voltage and the third voltage.

According to the configurations (1) and (4) to (6) described above, it is possible to determine whether the malfunction in the crowbar circuit is a first malfunction or a second function by comparing the first voltage and the second voltage. Further, it is possible to determine whether or not the malfunction in the crowbar circuit is a third malfunction by comparing the second voltage and the third voltage. Thereby, it is possible to immediately determine the cause of a malfunction in the crowbar circuit.

(7) The controller is configured to determine that a malfunction is present in the power transmission device when it is determined that no malfunction is present in the power reception device.

According to the configuration (7) described above, if no malfunction is present in the crowbar circuit (in other words, in the power reception device), then it is determined that the malfunction that prevents the power reception device from receiving power normally is on the power transmission device.

(8) Each of the first switching element and the second switching element is a MOSFET. The first and second diodes are parasitic diodes of the first switching element and the second switching element, respectively.

According to the configuration (8) described above, as compared with the case where the first switching element and the first diode are implemented as separate parts and the second switching element and the second diode are implemented as separate parts, it is possible to downsize the crowbar circuit.

(9) A wireless power transmission system according to another aspect of the present disclosure includes the power transmission device and the power reception device.

According to the configuration (9) described above, similar to the configuration (1) described above, it is possible to immediately determine the spot of a malfunction in the crowbar circuit.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 4(A) is a circuit diagram illustrating the configuration of a power reception device when a transistor TR2 is normal (before a short circuit command is outputted);

FIG. 4(B) is a circuit diagram illustrating the configuration of the power reception device when the transistor TR2 is normal (after a short circuit command is outputted);

FIG. 5(A) is a circuit diagram illustrating the configuration of a power reception device when an open circuit failure is present in the transistor TR2 (before a short circuit command is outputted);

FIG. 5(B) is a circuit diagram illustrating the configuration of the power reception device when an open circuit failure is present in the transistor TR2 (after a short circuit command is outputted);

FIG. 7(A) is a time chart (first graph) schematically illustrating a malfunction spot determination process according to a second embodiment;

FIG. 7(B) is a time chart (second graph) schematically illustrating the malfunction spot determination process according to the second embodiment;

FIG. 7(C) is a time chart (third graph) schematically illustrating the malfunction spot determination process according to the second embodiment;

FIG. 7(D) is a time chart (fourth graph) schematically illustrating the malfunction spot determination process according to the second embodiment;

FIG. 7(E) is a time chart (fifth graph) schematically illustrating the malfunction spot determination process according to the second embodiment;

FIG. 7(F) is a time chart (sixth graph) schematically illustrating the malfunction spot determination process according to the second embodiment;

FIG. 8(A) is an equivalent circuit diagram of the crowbar circuit after the output of a short circuit command SC1 (when the first switching element is normal);

FIG. 8(B) is an equivalent circuit diagram of the crowbar circuit after the output of the short circuit command SC1 (when an open circuit failure is present in the first switching element);

FIG. 8(C) is an equivalent circuit diagram of the crowbar circuit after the output of the short circuit command SC1 (when a short circuit failure is present in the first switching element);

FIG. 8(D) is an equivalent circuit diagram of the crowbar circuit after the output of the short circuit command SC1 (when a short circuit failure is present in the second switching element);

FIG. 9(A) is an equivalent circuit diagram of the crowbar circuit after the output of a short circuit command SC2 (when the second switching element is normal);

FIG. 9(B) is an equivalent circuit diagram of the crowbar circuit after the output of the short circuit command SC2 (when an open circuit failure is present in the second switching element);

FIG. 11 is a diagram for explaining a malfunction determination process based on a combination of a voltage V21 and a voltage V22.

DESCRIPTION OF THE EMBODIMENTS

Figure 1:
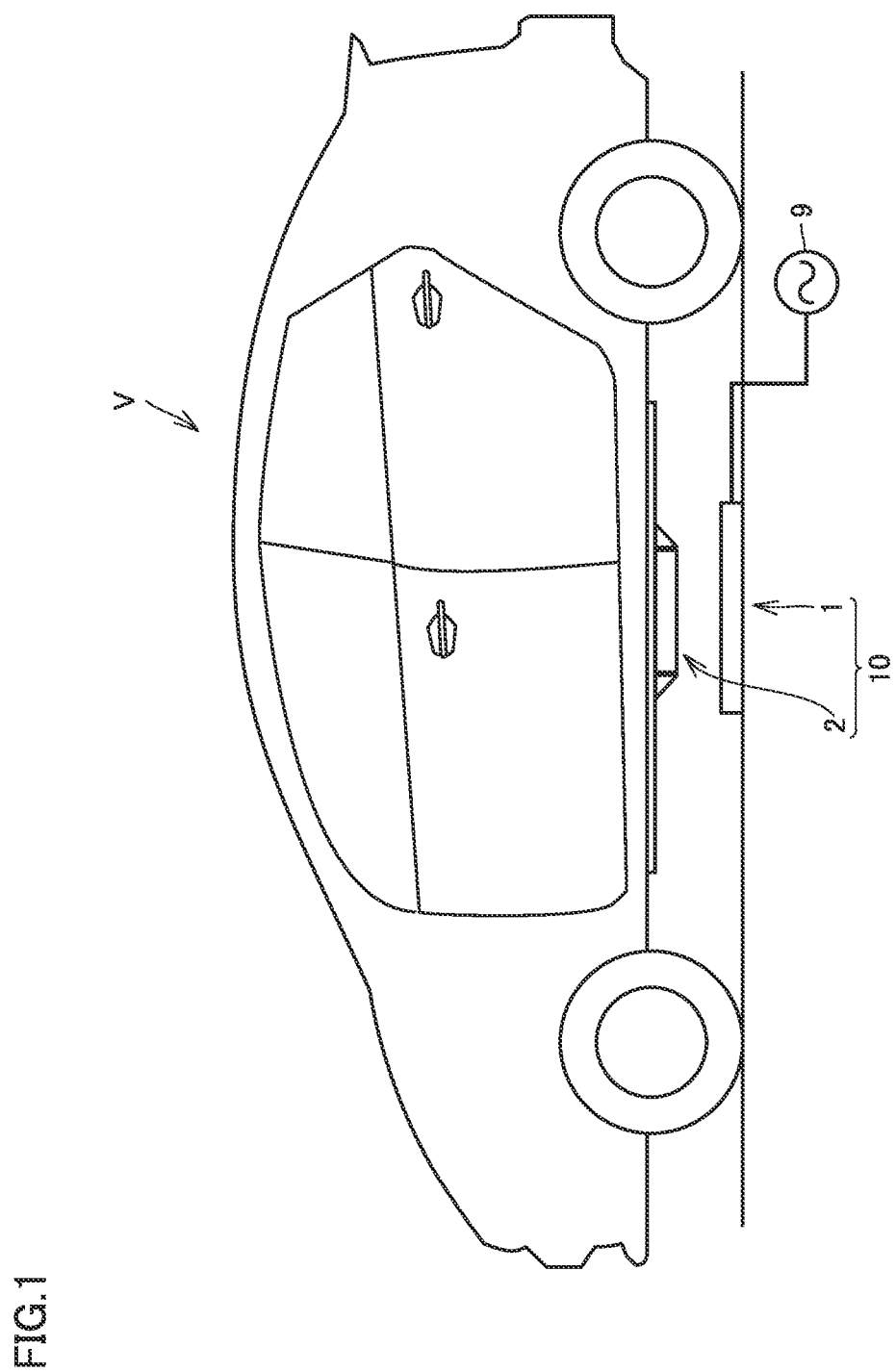
FIG. 1 is a diagram schematically illustrating the overall configuration of a wireless power transmission system according to a first embodiment.

Hereinafter, embodiments of the present disclosure will be described in detail with reference to the drawings. In the drawings, the same or corresponding parts are denoted by the same reference numerals, and the description thereof will not be repeated.

First Embodiment

<Configuration of Wireless Power Transmission System>

FIG. 1 is a diagram illustrating the overall configuration of a wireless power transmission system 10 according to a first embodiment. With reference to FIG. 1, the wireless power transmission system 10 includes a power transmission device 1 and a power reception device 2.

The power transmission device 1 is installed, for example, on the ground, and is configured to receive power supplied from an AC power supply 9 (for example, a commercial power supply system). The power transmission device 1 is configured to transmit power to the power reception device 2 in a wireless manner through an electromagnetic field when a vehicle V is aligned so that the power reception device 2 mounted on the vehicle V is facing the power transmission device 1.

Figure 2:
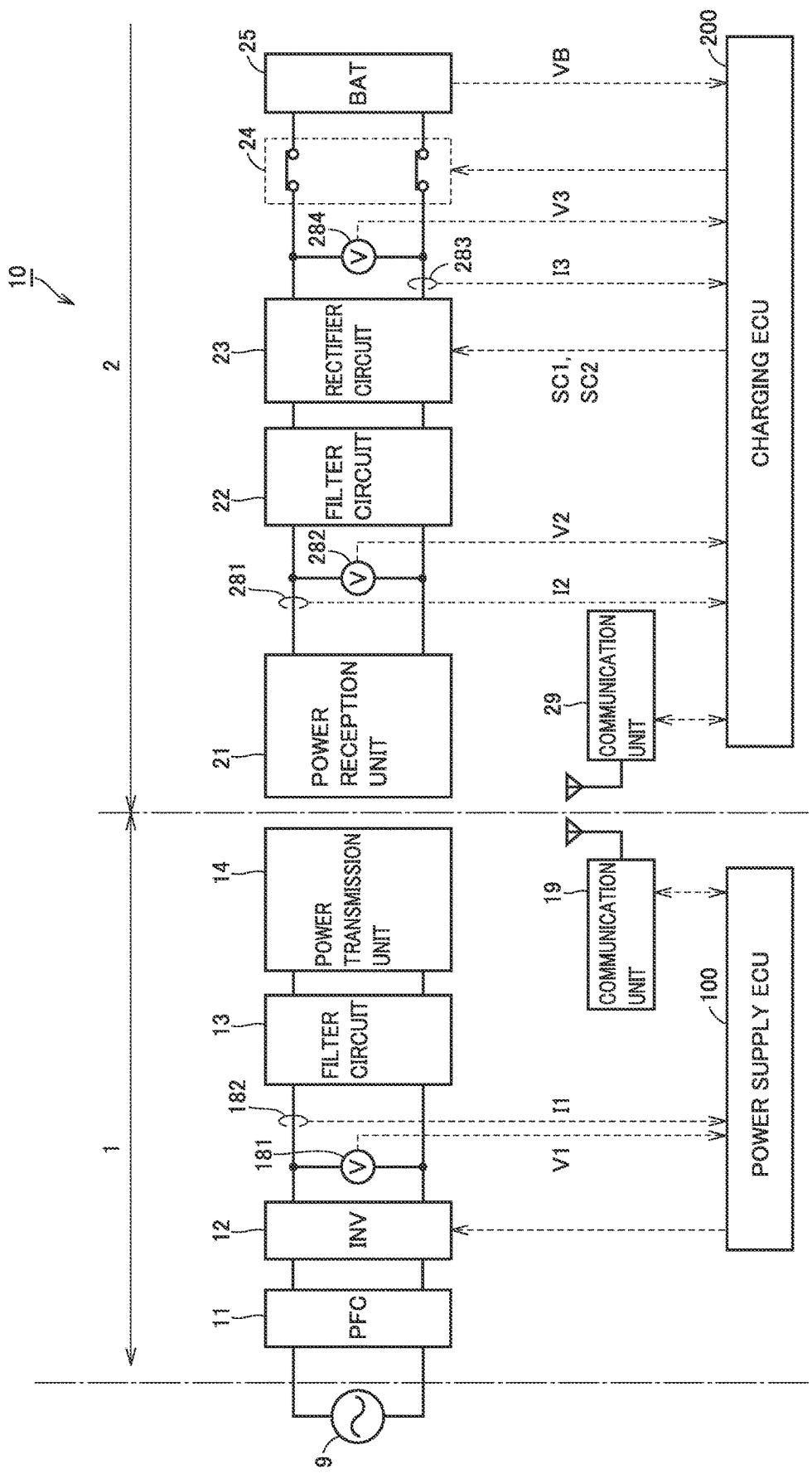
FIG. 2 is a circuit block diagram schematically illustrating the configuration of the wireless power transmission system.

The power reception device 2 is mounted on the vehicle V which travels by using power stored in a power storage device 25 (see FIG. 2). The power reception device 2 is disposed, for example, on a lower surface of the vehicle V (which faces the road surface), and is configured to receive power from the power transmission device 1 in a wireless manner.

FIG. 2 is a circuit block diagram schematically illustrating the configuration of the wireless power transmission system 10. With reference to FIG. 2, the power transmission device 1 includes a PFC (Power Factor Correction) circuit 11, an inverter 12, a filter circuit 13, a power transmission unit 14, a voltage sensor 181, a current sensor 182, a communication unit 19, and a power supply ECU (Electronic Control Unit) 100.

On the other hand, the power reception device 2 includes a power reception unit 21, a filter circuit 22, a rectifier circuit 23, a relay circuit 24, a power storage device 25, a communication unit 29, a charging ECU 200, a current sensor 281, a voltage sensor 282, a current sensor 283, and a voltage sensor 284.

In the wireless power transmission system 10, the power from the AC power supply 9 is supplied to the power transmission unit 14 via the PFC circuit 11, the inverter 12 and the filter circuit 13. The power transmitting unit 14 and the power reception unit 21 each is provided with a coil and a capacitor and is designed to resonate at a transmission frequency. In some embodiments, the Q factor indicating the resonance strength of the power transmission unit 14 and the power reception unit 21 is 100 or more. When the power transmission unit 14 in the power transmission device 1 is supplied with electric power for transmission (hereinafter referred to as "transmission power"), an electromagnetic field is formed between a power transmission coil provided in the power transmission unit 14 and a power reception coil provided in the power reception unit 21, and the energy (electric power) is transferred from the power transmission unit 14 to the power reception unit 21 through the electromagnetic field. The energy (electric power) transferred to the power reception unit 21 is stored in the power storage device 25 via the filter circuit 22, the rectifier circuit 23, and the relay circuit 24.

More specifically, the PFC circuit 11 is configured to rectify and boost the AC power received from the AC power supply 9 and supply it to the inverter 12 while correcting the power factor by bringing an input current close to a sinusoidal wave. Any of various known PFC circuits may be adopted as the PFC circuit 11. Note that a rectifier without a power factor correction function may be adopted as a replace to the PFC circuit 11.

The inverter 12 is provided between the PFC circuit 11 and the filter circuit 13, and is configured to convert the DC power received from the PFC circuit 11 into AC power having a predetermined transmission frequency (transmission power). The inverter 12 is a voltage inverter, and each switching element constituting the inverter 12 is connected in anti-parallel to a freewheel diode. The inverter 12 is implemented by, for example, a single-phase full bridge circuit.

The filter circuit 13 is provided between the inverter 12 and the power transmission unit 14, and is configured to suppress harmonic noise caused by the inverter 12. The filter circuit 13 is implemented by, for example, an LC filter including an inductor and a capacitor.

The power transmission unit 14 receives the AC power having a transmission frequency (transmission power) from the inverter 12 via the filter circuit 13 and transmits the power to the power reception unit 21 of the power reception device 2 in a wireless manner through an electromagnetic field formed around the power transmission unit 14. The power transmission section 14 includes a resonance circuit for transmitting power to the power reception unit 21 in a wireless manner. The resonance circuit is implemented by a power transmission coil and a capacitor (not shown).

The voltage sensor 181 is configured to detect an output voltage of the inverter 12 and output the detection value to the power supply ECU 100. The current sensor 182 is configured to detect an output current of the inverter 12 and output the detection value to the power supply ECU 100. Based on the detection values from the voltage sensor 181 and the current sensor 182, it is possible to detect the transmission power supplied from the inverter 12 to the power transmission unit 14. It should be noted that the transmitted power may be detected by detecting the voltage and the current in the DC lines between the PFC circuit 11 and the inverter 12.

The communication unit 19 is configured to perform wireless communication with the communication unit 29 of the power reception device 2 so as to receive a target value of the transmission power (target power) sent from the power reception device 2, and exchange information such as the start/stop of power transmission and the power reception status of the power reception device 2.

The power supply ECU 100 includes a CPU (Central Processing Unit), a memory, an input/output buffer and the like (neither of which is shown in the drawings). The power supply ECU 100 is configured to receive signals from various sensors and devices and control various elements in the power transmission device 1.

As an example, when the electric power is being transmitted from the power transmission device 1 to the power reception device 2, the power supply ECU 100 controls the switching of the inverter 12 so as to make the inverter 12 generate the transmission power. More specifically, the power supply ECU 100 adjusts the duty of the output voltage of the inverter 12, for example, so as to control the transmission power to the target power. Note that the target value of the transmission power may be generated based on the power reception status of the power reception device 2. The target value of the transmission power is generated on the basis of a difference between the target value and the detection value of the power received by the power reception device 2 and is sent from the power reception device 2 to the power transmission device 1. Further, as another example of the control by the power transmission device 1, the power supply ECU 100 estimates the resonance frequency of the resonance circuit constituting the power reception unit 21.

The power reception unit 21 receives power (AC power) transmitted from the power transmitting unit 14 of the power transmission device 1 in a wireless manner through an electromagnetic field formed between the power reception unit 21 and the power transmitting unit 14. The power reception unit 21 includes a resonance circuit for receiving power from the power transmitting unit 14 in a wireless manner. The resonance circuit is implemented by a power reception coil L1 and a capacitor C1 (see FIG. 3). Then, the power reception unit 21 outputs the received power to the filter circuit 22 at the rear stage.

The filter circuit 22 is provided between the power reception unit 21 and the rectifier circuit 23, and is configured to suppress harmonic noise produced at the time of power reception. The filter circuit 22 is implemented by a low-pass filter (see FIG. 3).

The rectifier circuit 23 is provided between the power reception unit 21 and the relay circuit 24, and is configured to rectify the AC power received by the power reception unit 21 and output the rectified AC power to the relay circuit 24. The detailed configuration of the rectifier circuit 23 will be described with reference to FIG. 3.

The relay circuit 24 (charging relay) is provided between the rectifier circuit 23 and the power storage device 25, and is closed (turned on) when the power storage device 25 is being charged by the power transmission device 1. Although not particularly shown in the drawings, a DC/DC converter configured to adjust the output voltage of the rectifier circuit 23 may be provided between the rectifier circuit 23 and the power storage device 25 (for example, between the rectifier circuit 23 and the relay circuit 24).

The power storage device 25 is a rechargeable DC power supply, and is implemented by a secondary battery such as a lithium ion secondary battery or a nickel hydrogen battery. It is acceptable to adopt a capacitor having a large capacity as the power storage device 25. The power storage device 25 stores power outputted from the rectifier circuit 23. Then, the power storage device 25 supplies the stored electric power to a driving device (not shown) of a motor generator.

Although not shown in the drawings, the power storage device 25 is provided with a voltage sensor. The voltage sensor is configured to detect a voltage VB of the power storage device 25 and output the detection value to the charging ECU 200. The voltage VB is, for example, a high voltage of several hundred volts.

The current sensor 281 is configured to detect a current I2 flowing through the power reception unit 21 and output the detection value to the charging ECU 200. The voltage sensor 282 is configured to detect an output voltage V2 (of the power received) from the power reception unit 21. The current sensor 283 is configured to detect an output current I3 from the rectifier circuit 23. The voltage sensor 284 is configured to detect an output voltage V3 from the rectifier circuit 23. Each sensor outputs the detection value to the charging ECU 200.

It is possible to detect the power received by the power reception unit 21 (the charging power of the power storage device 25) based on the detection values of the current sensor 283 and the voltage sensor 284. The current sensor 281 and the voltage sensor 282 are disposed closer to the power reception unit 21 than the rectifier circuit 23 so that the current I2 and the voltage V2 of the power reception unit 21 may be detected even when the switching elements Q1 and Q2 (to be described later) of the rectifier circuit 23 are actuated. The voltage sensor 282 corresponds to the "voltage sensor" according to the present disclosure, and the current sensor 281 corresponds to the "current sensor" according to the present disclosure.

The communication unit 29 is configured to perform wireless communication with the communication unit 19 of the power transmission device 1 so as to send a target value of the transmission power (target power) generated by the charging ECU 200 to the power transmission device 1. Further, the communication unit 29 is configured to exchange information on the start/stop of power transmission with the power transmission device 1, and send the power reception status (such as the voltage, current and amount of the received power) of the power reception device 2 to the power transmission device 1.

The charging ECU 200 includes a CPU, a memory, an input/output buffer and the like (neither of which is shown in the drawings), and is configured to receive signals from various sensors and devices and control various elements in the power reception device 2. Various controls to be performed by the charging ECU 200 (and the power supply ECU 100 mentioned above) is not limited to be executed by software, they may be executed by dedicated hardware (such as an electronic circuit).

As an example of a main control to be performed by the charging ECU 200, in addition to the generation of the target value of the transmission power (target power) described above, a short circuit control of the rectifier circuit 23 may be given. When the resonance frequency of the resonance circuit constituting the power reception unit 21 is estimated in the power supply ECU 100 of the power transmission device 1, the charge ECU 200 outputs short circuit commands SC1 and SC2 to the rectifier circuit 23. When the pair of power lines (the power lines ACL1 and ACL2) between the filter circuit 22 and the relay circuit 24 is short-circuited by the rectifier circuit 23, the impedance at the rear stage of the filter circuit 22 may be considered as substantially 0. Thereby, the frequency at which the current flowing through the power transmission unit 14 of the power transmission device 1 is the minimum may be estimated as the resonance frequency of the resonance circuit of the power reception unit 21.

As an example of another main control to be performed by the charging ECU 200, a malfunction detection process performed in the wireless power transmission system 10 may be given. The details of the malfunction detection process will be described hereinafter.

<Configuration of Power Reception Device>

Figure 3:
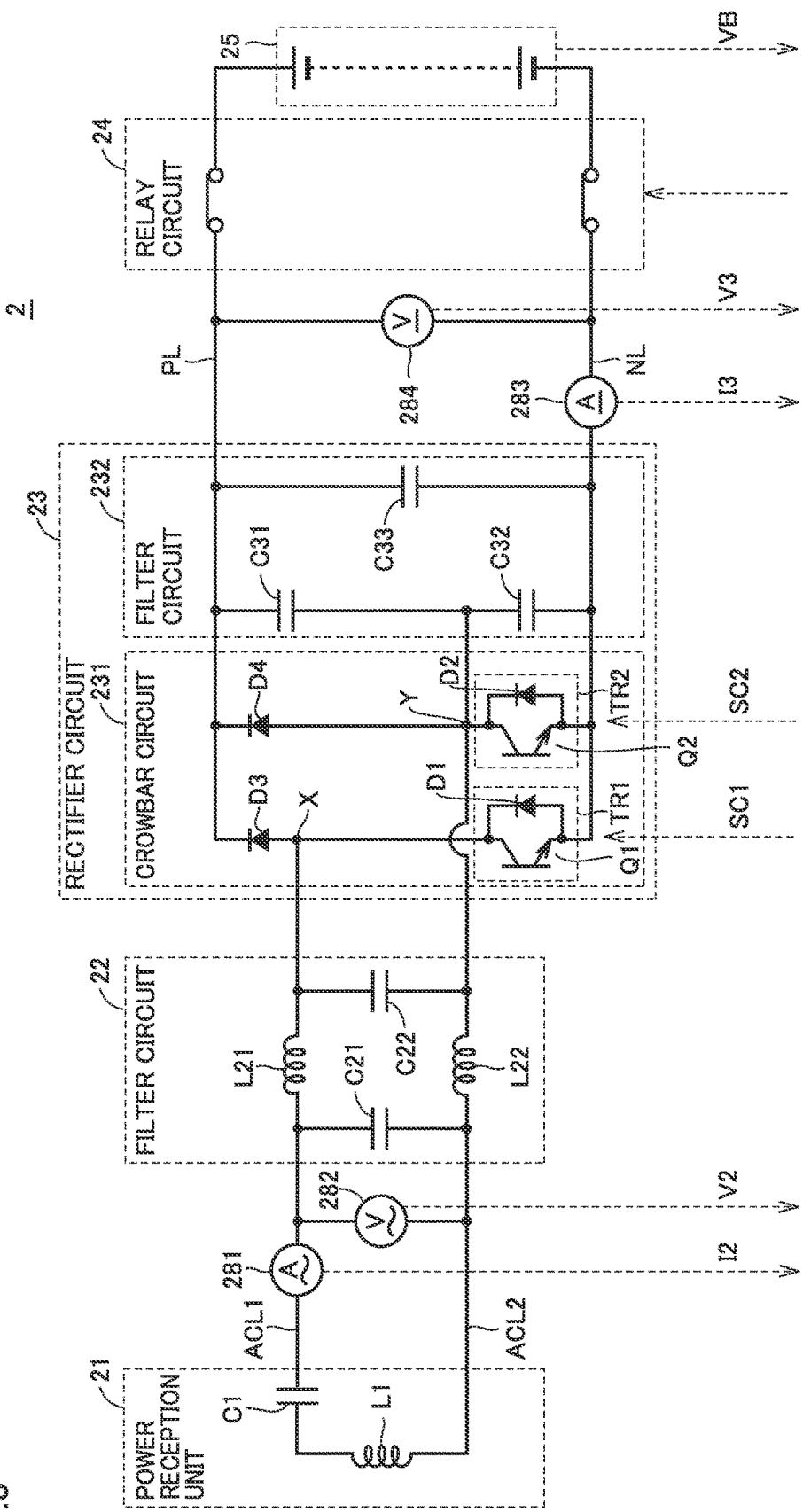
FIG. 3 is a circuit block diagram illustrating the configuration of a power reception device in more detail.

FIG. 3 is a circuit block diagram illustrating the configuration of the power reception device 2 in more detail. With reference to FIG. 3, the power reception unit 21 includes a power reception coil L1 and a capacitor C1. The power reception coil L1 is connected between a power line ACL1 (first power line) and a power line ACL2 (second power line). The capacitor C1 is provided to compensate for the power factor of the received power, and is connected to the power line ACL1.

The filter circuit 22 is implemented as an LC filter for suppressing harmonic noise produced by a current at the time of receiving power from the power transmission device 1. The filter circuit 22 includes coils L21 and L22, and capacitors C21 and C22. The coil L21 is connected to the power line ACL1. The coil L22 is connected to the power line ACL2. Each of the capacitors C21 and C22 is connected between the power line ACL1 and the power line ACL2. The order of the LC filter constituting the filter circuit 22 is not particularly limited. One or both of the capacitors C21 and C22 corresponds to the "first capacitor" according to the present disclosure.

The rectifier circuit 23 includes a crowbar circuit 231 and a filter circuit 232. The crowbar circuit 231 is configured to rectify the full wave of the AC power from the filter circuit 22 and outputs it to a positive electrode line PL and a negative electrode line NL. The filter circuit 232 is connected to the positive electrode line PL and the negative electrode line NL at the rear stage of the crowbar circuit 231. The positive electrode line PL and the negative electrode line NL are electrically connected to the positive electrode and the negative electrode of the power storage device 25 via the relay circuit 24, respectively.

The crowbar circuit includes 4 diodes D1 to D4 (first to fourth diodes) and 2 switching elements Q1 and Q2 (first and second switching elements).

Each of the switching elements Q1 and Q2 is, for example, a MOSFET (Metal-Oxide-Semiconductor Field-Effect Transistor). The diodes D1 and D2 are parasitic diodes of the switching elements Q1 and Q2, respectively. In FIG. 3, these MOSFETs are denoted by transistors TR1 and TR2. By using the MOSFETs in this manner, it is possible to downsize the rectifier circuit 23 as compared with the case where the switching element Q1 and the diode D1 are separately implemented by discrete elements and the switching element Q2 and the diode D2 are separately implemented by discrete elements.

The diodes D1 to D4 constitute a diode bridge. Therefore, it may be considered that the crowbar circuit 231 is obtained by replacing two of the four diodes constituting the general diode bridge with MOSFETs.

More specifically, the anode of the diode D3 is connected to the negative electrode line NL, and the cathode of the diode D1 is connected to the power line ACL1. The switching element Q1 is connected in parallel to the diode D1. Similarly, the anode of the diode D2 is connected to the negative electrode line NL, and the cathode of the diode D2 is connected to the power line ACL2. The switching element Q2 is connected in parallel with the diode D2.

The anode of the diode D3 is connected to the power line ACL1, and the cathode of the diode D3 is connected to the positive electrode line PL. The anode of the diode D4 is connected to the power line ACL2, and the cathode of the diode D4 is connected to the positive electrode line PL. The connection point between the cathode of the diode D1 and the power line ACL1 is denoted as "X", and the connection point between the cathode of the diode D2 and the power line ACL2 is denoted as "Y".

The filter circuit 232 smoothes the waveform of the AC power rectified by the crowbar circuit 231 and supplies it to the relay circuit 24. The filter circuit 232 includes capacitors C31, C32 and C33. The capacitor C31 is electrically connected between the positive electrode line PL and the power line ACL2. The capacitor C32 is electrically connected between the power line ACL2 and the negative electrode line NL. The capacitor C33 is connected between the positive electrode line PL and the negative electrode line NL. The capacitor C32 corresponds to the "second capacitor" according to the present disclosure.

<Malfunction Detection in Wireless Power Transmission System>

When the crowbar circuit 231 having the above configuration is adopted in the power reception device 2, a malfunction may occur in the crowbar circuit 231, which may prevent the power transmission from being performed normally, and as a result, the power storage device 25 of the vehicle V may not be charged successfully.

However, by monitoring the detection value from the current sensor 182 provided in the power transmission device 1 and the detection value from the current sensor 281 provided in the power reception device 2, for example, it is possible to detect whether or not a malfunction is present in the wireless power transmission system 10. More specifically, although the current sensor 182 provided at the rear stage of the inverter 12 of the power transmission device 1 can detect a current I1 (I1>0), if the current sensor 281 provided at the rear stage of the power reception unit 21 of the power reception device 2 cannot detect a current I2 (I2=0), the power reception device 2 is not receiving power successfully even though the inverter 12 is performing the power conversion operation normally.

However, sometimes it is difficult to determine the cause of a malfunction, in other words, it is difficult to determine the malfunction spot where a malfunction occurs. Thus, a repair technician will have to take a long time to repair the wireless power transmission system 10 (for example, by replacing some of the parts), or the repair technician may simply replace the entire system but it will cost a lot.

Thus, in the present embodiment, the malfunction spot is determined by outputting the short circuit commands SC1 and SC2. In the first embodiment, assuming that the transistor TR1 is normal, an "open circuit failure detection process" is executed so as to detect the open circuit failure in the transistor TR2 (in both the switching element Q2 and the diode D2). The short circuit commands SC1 and SC2 correspond to the "first control signal" and the "second control signal" according to the present disclosure, respectively.

When both of the transistors TR1 and TR2 are normal, the switching element Q1 is made conductive in response to the short circuit command SC1, and the switching element Q2 is made conductive in response to the short circuit command SC2. Thus, as will be described in detail with reference to FIGS. 4(A) and 4(b), the electric charges stored in the capacitors C21 and C22 connected between the power line ACL1 and the power line ACL2 are completely discharged. On the contrary, if an open circuit failure is present in the transistor TR2, the switching element Q2 does not respond to the short circuit command SC2, and thereby, the discharge does not occur, the electric charges will remain in the capacitors C21 and C22 (see FIG. 5). Based on such difference, in the first embodiment, the voltage sensor 282 is provided to monitor the voltage of the capacitors C21 and C22, in other words, the voltage between the power lines ACL1 and ACL2 after outputting the short circuit commands SC1 and SC2.

FIGS. 4(A) and 4(B) are circuit diagrams illustrating the configuration of the power reception device 2 when the transistor TR2 is normal. FIG. 4(A) illustrates a state before the short circuit commands SC1 and SC2 are outputted, and FIG. 4(B) illustrates a state after the short circuit commands SC1 and SC2 are outputted. The same applies to FIGS. 5(A) and 5(B) to be described later.

With reference to FIG. 4(A), for example, it is assumed that each relay included in the relay circuit 24 is closed (ON), and thereby, the rectifier circuit 23 and the power storage device 25 are electrically connected, and the capacitors C21 and C22 are charged.

Before the short circuit commands SC1 and SC2 are outputted, the switching elements Q1 and Q2 are non-conductive. At this time, the voltage V2, which is the detection value of the voltage sensor 282, is equal to the voltage of the capacitors C21 and C22. More specifically, if the voltage of the capacitors C21 and C22 is higher than the voltage (VC31) of the capacitor C31, a current will flow through the diode D3 until the voltage of the capacitors C21 and C22 becomes substantially equal to the voltage of the capacitor C31. On the other hand, if the voltage of the capacitors C21 and C22 is lower than the voltage (VC31) of the capacitor C31, the voltage V2 is equal to the sum of the voltage (VC31) of the capacitor C31 and the reverse voltage (−VD3) of the diode D3 (V2=VC31−VD3).

Next, with reference to FIG. 4(B), each relay included in the relay circuit 24 is opened (OFF), and thereby, the rectifier circuit 23 and the power storage device 25 are electrically disconnected from each other. At this state, when the short circuit commands SC1 and SC2 are outputted from the charging ECU 200, the switching elements Q1 and Q2 are made conductive. Thus, a current path PATH1 indicated by arrows is formed in FIG. 4(B). In other words, a closed circuit is formed from the capacitor C21 through the coil L21, the connection point X, the switching element Q1, the switching element Q2, the connection point Y and the coil L22 back to the capacitor C21.

In the current path, the power line ACL1 and the negative electrode line NL are short-circuited by the switching element Q1, and the power line ACL2 and the negative electrode line NL are short-circuited by the switching element Q2. As a result, the power line ACL1 and the power line ACL2 are short-circuited. Thus, the electric charges stored in the capacitors C21 and C22 are discharged. Since the power line ACL2 and the negative electrode line NL are short-circuited, the capacitor C32 is also completely discharged. As a result, the voltage V2, which is the detection value of the voltage sensor 282, is substantially 0.

FIGS. 5(A) and 5(B) are circuit diagrams illustrating the configuration of the power reception device 2 when an open circuit failure is present in the transistor TR2. As illustrated in FIG. 5(A), before outputting the short circuit commands SC1 and SC2, even if an open circuit failure is present in the transistor TR2, the capacitors C21 and C22 are charged.

With reference to FIG. 5(B), the short circuit commands SC1 and SC2 are outputted in a state where the relay circuit 24 is opened and the rectifier circuit 23 and the power storage device 25 are electrically disconnected. Since an open circuit failure is present in the transistor TR2, only the switching element Q1 of the transistor TR1 is conductive.

Hereinafter, the description will be carried out on a path from the capacitor C21 (negative electrode side) through the coil L22, the connection point Y, the capacitor C32, the switching element Q1, the connection point X and the coil L21 back to the capacitor C21 (positive electrode side). When an open circuit failure is present in the transistor TR2, the power line ACL2 and the negative electrode line NL are not short-circuited. Therefore, the electric charges will remain in the capacitor C32, and the voltage V2 detected by the voltage sensor 282 is equal to the reverse voltage (−V32) of the capacitor C32. Therefore, the voltage V2 detected by the voltage sensor 282 is not 0 but a negative value.

As described above, whether or not an open circuit failure in present in the transistor TR2 may be determined based on whether the voltage V2 detected by the voltage sensor 282 after the output of the short circuit commands SC1 and SC2 is substantially 0 or a negative value.

<Failure Detection Process for Detecting Open Circuit Failure in TR2>

Figure 6:
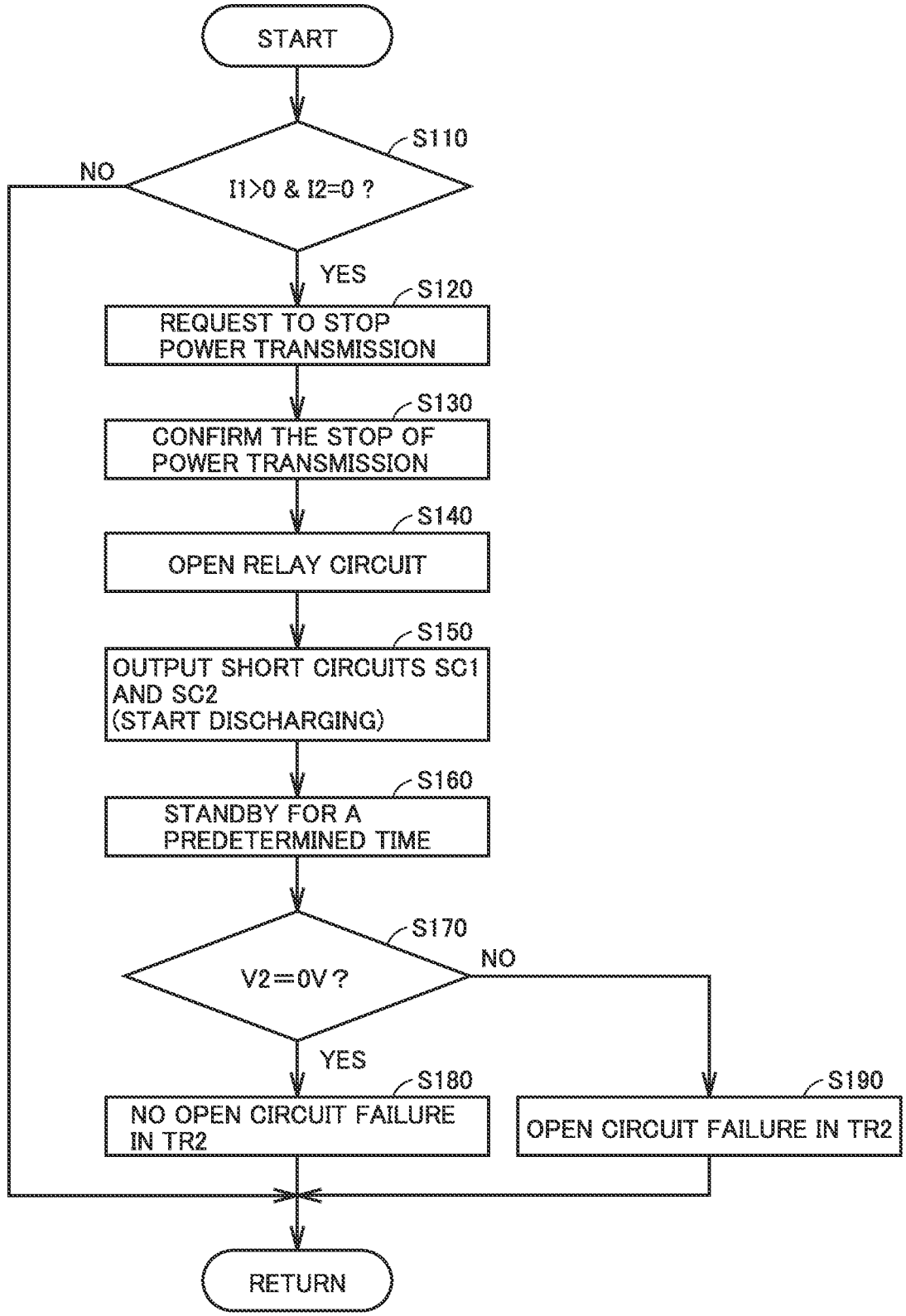
FIG. 6 is a flowchart illustrating a failure detection process for detecting an open circuit failure in the transistor TR2 according to the first embodiment.

FIG. 6 is a flowchart illustrating a failure detection process for detecting an open circuit failure in the transistor TR2 according to the first embodiment. The process may be called from the main routine (not shown) and executed when a predetermined condition is satisfied (for example, when electric charges are stored in the capacitors C21, C22 and the detection value V2 of the voltage sensor 282 is higher than a predetermined value). It is assumed that the relay circuit 24 is closed as the process is being executed.

Each step (hereinafter, the term of step will be abbreviated as "S" where appropriate) included in this flowchart and a flowchart illustrated in FIG. 10 to be described later is basically implemented by software included in the charging ECU 200, but it may be implemented by an electronic circuit fabricated within the charging ECU 200.

With reference to FIG. 6, in S110, the charging ECU 200 determines whether or not the power reception device 2 is not receiving power successfully even though the inverter 12 is performing the power conversion operation normally. For example, although the current sensor 182 provided at the rear stage of the inverter 12 of the power transmission device 1 can detect a current I1 (I1>0), if the current sensor 281 provided at the rear stage of the power reception unit 21 of the power reception device 2 cannot detect a current I2 (I2=0), in other words, YES in S110, the process proceeds to S120. Otherwise (NO in S110), the process returns to the main routine without executing the subsequent steps.

In S120, the charging ECU 200 sends a request signal to the power supply ECU 100 in the power transmission device 1 from the communication unit 29 for stopping the power transmission from the power transmission device 1 so as to stop the inverter 12 from performing the power conversion operation.

In S130, the charging ECU 200 confirms that the power transmission from the power transmission device 1 is stopped based on the detection value of the current sensor 281 or the voltage sensor 282, for example. As an example, if the detection value (I2) of the current sensor 281 is 0 or if the detection value (V2) of the voltage sensor 282 is constant, it is determined that the power transmission is stopped.

In S140, the charging ECU 200 opens the relay circuit 24. As a result, the capacitors C31, C32 and C33 included in the filter circuit 232 are electrically disconnected from the power storage device 25. At this moment, the total voltage of the capacitors C31 and C32 is equal to the voltage VB of the power storage device 25. Thus, the voltage of the capacitor C31 and the voltage of the capacitor C32 each is a partial voltage of the voltage VB of the power storage device 25.

In S150, the charging ECU 200 outputs the short circuit commands SC1 and SC2 for discharging the capacitors C21 and C22. If both the transistors TR1 and TR2 are normal, the switching elements Q1 and Q2 are made conductive (see FIG. 4(B)). On the other hand, if the transistor TR2 has an open circuit failure even though the transistor TR1 is normal, the switching element Q2 remains non-conductive (see FIG. 5(B)).

The charging ECU 200 stands by for a predetermined time (for example, several milliseconds) after outputting the short circuit commands SC1 and SC2 (S160). The standby time is required for discharging the capacitors C21 and C22 when the transistors TR1 and TR2 are normal, and may be defined appropriately by experiments or simulations.

In S170, the charging ECU 200 determines whether or not the voltage V2 which is the detection value of the voltage sensor 282 is substantially 0. If the voltage V2 is substantially 0, more specifically, if the voltage V2 is within a predetermined voltage range R (including 0) which is defined by taken into consideration the detection error of the voltage sensor 282 (YES in S170), the charging ECU 200 determines that the transistor TR2 is normal (S180).

On the other hand, if the voltage V2 is not substantially 0, more specifically, if the voltage V2 is beyond the voltage range R (NO in S170), as described with reference to FIGS. 5(A) and 5(B), the charging ECU 200 determines that an open circuit failure is present in the transistor TR2 (S190).

When it is determined in S190 that an open circuit failure is present in the transistor TR2, the charging ECU 200 may create a diagnosis (self-diagnosis) requesting repairs (or part replacements) for the transistor TR2. Based on the diagnosis, a repair technician for repairing the wireless power transmission system 10 may quickly repair the transistor TR2 (or the rectifier circuit 23 including the transistor TR2). After the processing in S180 and S190, the process returns to the main routine.

As described above, in the first embodiment, the charging ECU 200 outputs the short circuit commands SC1 and SC2 to the crowbar circuit 231, and thereafter, the voltage sensor 282 detects the changes in the voltage V2 of the capacitors C21 and C22. If the voltage V2 is substantially 0, the charging ECU 200 determines that no open circuit failure is present in the transistor TR2. On the other hand, if the voltage V2 is a negative value, the charging ECU 200 determines that an open circuit failure is present in the transistor TR2. Thus, it is possible to detect the open circuit failure in the transistor TR2 and determine the malfunction spot, which makes it possible for a repair technician to perform necessary repairs immediately.

In S140, the relay circuit 24 is opened, and in S150, the short circuit commands SC1, SC2 are outputted after the capacitor C32 is electrically disconnected from the power storage device 25. Therefore, if an open circuit failure is present in the transistor TR2, the electric charges stored in the capacitor C32 cannot be discharged after the output of the short circuit commands SC1 and SC2, compared with the case where the capacitor C32 is connected to another load (not shown), more electric charges are trapped in the capacitor C32. Therefore, the negative value of the voltage V2 becomes sufficiently large, which makes it possible to more reliably determine whether or not an open circuit failure is present in the transistor TR2.

Second Embodiment

In the first embodiment, the configuration for detecting an open circuit failure in the transistor TR2 has been described. In the second embodiment, a process for determining a malfunction in the rectifier circuit 23 will be described. The process is referred to as "malfunction spot determination process", and will be described in detail below. Since the configuration of the wireless power transmission system according to the second embodiment is equivalent to the configuration of the wireless power transmission system 10 according to the first embodiment (see FIGS. 1 to 3), the description thereof will not be repeated.

In the following description, it is assumed that the relay circuit 24 is closed, and the rectifier circuit 23 and the power storage device 25 are electrically connected. Moreover, it is assumed that it is before the power transmission from the power transmission device 1 is started, the transistors TR1 and TR2 are normal, and there is no electric charge in the capacitors C21 and C22.

<Malfunction Spot Determination Process>

FIGS. 7(A) to 7(F) are time charts schematically illustrating the malfunction spot determination process according to the second embodiment. In each graph of FIGS. 7(A) to 7(F), the horizontal axis denotes the elapsed time, and the vertical axis denotes the output/non-output of the short circuit command SC1, the conduction/non-conduction of the switching element Q1, the output/non-output of the short circuit command SC2, the conduction/non-conduction of the switching element Q2, and the voltage V2 in order from the top.

With reference to FIG. 7(A), firstly, the voltage V2 under the condition that none of the short circuit commands SC1 and SC2 is outputted is obtained as a voltage V21. Thereafter, the voltage V2 under the condition that the short circuit command SC1 is outputted but the short circuit command SC2 is not outputted is obtained as a voltage V22. Then, the voltage V21 and the voltage V22 are compared. Note that the voltage V21 and the voltage V22 correspond to the "first voltage" and the "second voltage" according to the present disclosure, respectively.

FIGS. 8(A) to 8(D) are equivalent circuit diagrams of the crowbar circuit 213 after the output of the short circuit command SC1. In FIGS. 8(A) to 8(D), an equivalent circuit of (or around) the crowbar circuit 213 is illustrated for each malfunction spot when the short circuit command SC1 is outputted but the short circuit command SC2 is not outputted.

First, when the transistor TR1 is normal, as illustrated in FIG. 7(A), before the output of the short circuit command SC1, no electric charge is stored in the capacitors C21 and C22, and thus the voltage V21=0V.

On the other hand, after the output of the short circuit command SC1, the voltage V22=VC31−VB. More specifically, with reference to FIG. 8(A), when the transistor TR1 is normal, taken into consideration the path from the power line ACL2 through the connection point Y, the capacitor C31, the positive electrode line PL, the power storage device 25, the switching element Q1 and the connection point X to the power line ACL1, the voltage V22 which is the voltage of the power line ACL1 with respect to the power line ACL2 is equal to the sum of a voltage (VC31) from the negative electrode side toward the positive electrode side of the capacitor C31 and a voltage (−VB) from the positive electrode side toward the negative electrode side of the storage device 25 (V22=VC31−VB).

The voltage V22 is determined according to the voltage dividing ratio between the capacitor C31 and the capacitor C32 (or the capacitance ratio between the capacitor C31 and the capacitor C32), and if VC31=0.7 VB, then V22=−0.3 VB. In other words, the detection value (V2) of the voltage sensor 282, which was originally 0V, decreases to a certain extent after the output of the short circuit command SC1.

Subsequently, with reference to FIG. 7(B), when an open circuit failure is present in the transistor TR1 (i.e., an open circuit failure is present in the switching element Q1 and the diode D1), the voltage V21=0V, and the voltage V22=0V. In other words, even after the short circuit command SC1 is outputted, the detection value (V2) of the voltage sensor 282 does not change, and is maintained at 0V.

More specifically, with reference to FIG. 8(B), when an open circuit failure is present in the transistor TR1, as seen from the equivalent circuit diagram, the voltage VB of the power storage device 25 at the rear stage of the diode bridge is applied to each diode of D1 to D4 in the diode bridge as a reverse voltage. The voltage VB does not affect the detection value (V22) of the voltage sensor 282 at the front stage of the diode bridge. As described above, since no electric charge is stored in the capacitors C21 and C22 (see FIG. 3) at the front stage of the diode bridge, the voltage V22=0V.

With reference to FIG. 7(C), if a short circuit failure is present in the transistor TR1 (i.e., a short circuit failure is present at least one of the switching element Q1 and the diode D1), the voltage V21=VC31−VB, the voltage V22=VC31−VB. In other words, even if the short circuit command SC1 is outputted, the detection value (V2) of the voltage sensor 282 remains constant at VC31−VB.

The equivalent circuit diagram when a short circuit failure is present in the transistor TR1 is illustrated in FIG. 8(C) regardless of whether or not the short circuit command SC1 is outputted. This equivalent circuit diagram is equivalent to the equivalent circuit diagram in the case where the transistor TR1 is normal and made conductive (see FIG. 8(A)). Therefore, V21=V22=VC31−VB.

Subsequently, with reference to FIG. 7(D), when a short circuit failure is present in the transistor TR2 (i.e., a short circuit failure is present at least one of the switching element Q2 and the diode D2), the voltage V21=0V, and the voltage Q2=0V. In other words, even after the short circuit command SC1 is outputted, the detection value (V2) of the voltage sensor 282 remains constant at 0V.

As illustrated in FIG. 8(D), when a short circuit failure is present transistor TR2, after the short circuit command SC1 is outputted to make the transistor TR1 conductive, the power line ACL1 and power line ACL2 are short-circuited (see path PATH2). Therefore, the voltage V22 after the output of the short circuit command SC1 is 0V.

As described above, in the second embodiment, the detection value (V21) of the voltage sensor 282 before the output of the short circuit command SC 1 is compared with the detection value (V22) of the voltage sensor 282 after the output of the short circuit command SC1. If the detection value is decreased from V21=0 to V22=VC31−VB, it is determined that the transistor TR1 is normal (see FIG. 7(A)).

On the contrary, if V21=V22=VC31−VB regardless of the output of the short circuit command SC1, it is determined that a short circuit failure is present in the transistor TR1 (see FIG. 7(C)). Further, if V21=V22=0V regardless of the output of the short circuit command SC1, it is determined that an open circuit failure is present in the transistor TR1 or a short circuit failure is present in the transistor TR2 (see FIGS. 7B and 7D).

Further, in the second embodiment, it is possible to determine whether or not an open circuit failure is present in the transistor TR2 by outputting the short circuit command SC2. The voltage V2 under the condition that the short circuit command SC2 is outputted after the output of the short circuit command SC1 is obtained as a voltage V23. The voltage V23 corresponds to the "third voltage" according to the present disclosure.

FIGS. 9(A) and 9(B) are equivalent circuit diagrams of the crowbar circuit 213 after the output of the short circuit command SC2. In FIGS. 9(A) and 9(B), an equivalent circuit of (or around) the crowbar circuit 213 is illustrated when the transistor TR1 is normal and the short circuit command SC2 is outputted after the output of the short circuit command SC1.

With reference to FIG. 7(E), when the transistor TR1 is normal and the short circuit command SC1 is outputted, as described with reference to FIG. 8(A), V22=VC31−VB. Further, when the transistor TR2 is normal and the short circuit command SC2 is outputted, V230V. In other words, the detection value (V2) of the voltage sensor 282 rises from the negative value to 0V after the output of the short circuit command SC2.

More specifically, as illustrated in FIG. 9(A), when the short circuit command SC2 is outputted after the output of the short circuit command SC1, both of the transistors TR1 and TR2 are made conductive. Thus, as described in the first embodiment (see FIG. 4(B)), both the electric charges stored in the capacitors C21 and C22 and the electric charges stored in the capacitor C32 are discharged. As a result, the voltage V23, which is the detection value of the voltage sensor 282, becomes equal to 0V.

On the other hand, as illustrated in FIG. 7(F), when an open circuit failure is present in the transistor TR2, V23=VC31−VB even though the short circuit command SC2 is outputted, and the detection value (V2) of the voltage sensor 282 does not change. Since the equivalent circuit diagram illustrated in FIG. 9(B) is equivalent to the equivalent circuit diagram illustrated in FIGS. 8A and 8C, the voltage V23=VC31−VB after the output of the short circuit command SC2. Thus, the detailed description thereof will not be repeated.

As described above, in the second embodiment, the detection value (V22) of the voltage sensor 282 before the output of the short circuit command SC2 is compared with the detection value (V23) of the voltage sensor 282 after the output of the short circuit command SC2. If the voltage rises from V22=VC31−VB to V23=0V, it is determined that the transistor TR2 is normal (see FIG. 7(E)). On the other hand, if the voltage remains constant at V22=V23=VC31−VB, it is determined that an open circuit failure is present in the transistor TR2 (see FIG. 7(F)).

<Malfunction Spot Determination Process>

Figure 10:
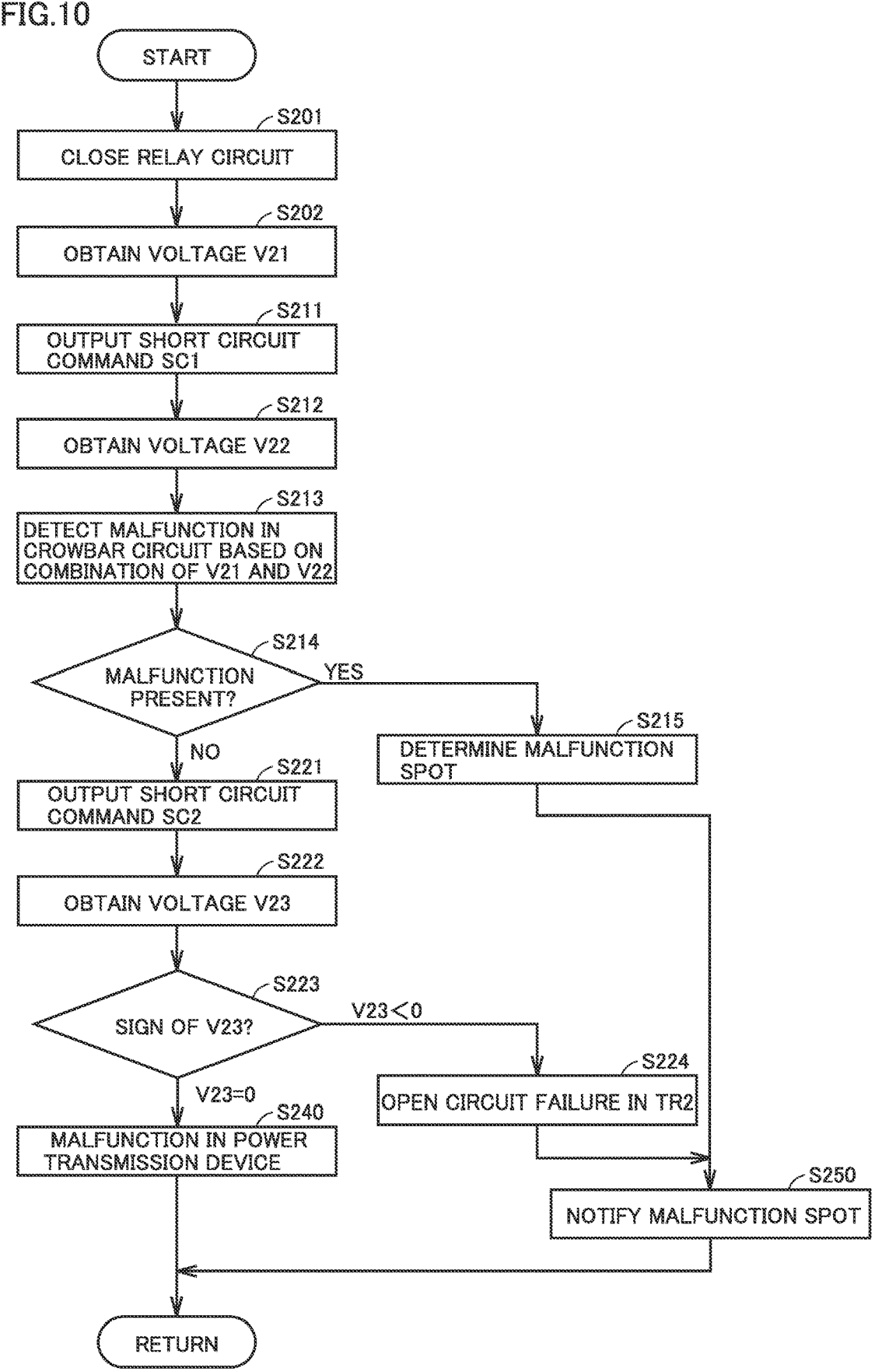
FIG. 10 is a flowchart illustrating an malfunction spot determination process according to the second embodiment.

FIG. 10 is a flowchart illustrating a malfunction spot determination process according to the second embodiment. It is assumed that the short circuit commands SC1 and SC2 are both outputted and the relay circuit 24 is open at the start of the process.

With reference to FIG. 10, firstly, the charging ECU 200 closes the relay circuit 24 (S201). Then, the charging ECU 200 obtains the voltage V21 that is the detection value of the voltage sensor 282 (S202). Thereafter, the charging ECU 200 outputs the short circuit command SC1 to the transistor TR1 (S211), and obtains the voltage V22 from the voltage sensor 282 (S212). Then, in S213, a malfunction determination process is performed based on a combination of the voltage V21 and the voltage V22.

FIG. 11 is a diagram for explaining a malfunction determination process (the process of S213) performed based on a combination of the voltage V21 and the voltage V22. As illustrated in FIG. 11, the spot of a malfunction in the rectifier circuit 23 may be determined based on the combination of the voltage V21 obtained before the output of the short circuit command SC1 and the voltage V22 obtained after the output of the short circuit command SC1.

Specifically, when the voltage V21=0V and the voltage V22=0V, the charging ECU 200 determines that an open circuit failure is present in the transistor TR1 (see FIG. 7(B)) or a short circuit failure is present in the transistor TR2 (see FIG. 7(D)). When the voltage V21=0V and the voltage V22=VC31−VB, the charging ECU 200 determines that the transistor TR1 is normal (see FIG. 7(A)). When the voltage V21=VC22=VC31−VB, the charging ECU 200 determines that a short circuit failure is present in the transistor TR1 (see FIG. 7(C)). It should be noted that it is impossible for the voltage to rise from the voltage V21=VC31−VB to the voltage V22=0V.

Returning to FIG. 10, for example, if it is determined from the result of the malfunction determination process that a malfunction is present (YES in S214) and the spot of the malfunction is determined (S215), a diagnosis for requesting repairs on the determined malfunction is created. Thereby, the malfunction is notified to the repair technician or the user (S250).

On the other hand, if no malfunction illustrated in FIG. 11 is present (NO in S214), the charging ECU 200 determines that the transistor TR1 is normal and outputs the short circuit command SC2 to the transistor TR2 (S221). Then, the charging ECU 200 obtains the voltage V23 from the voltage sensor 282 (S222), and determines the sign of the voltage V23 (S223).

When the voltage V23 is equal to VC31−VB, in other words, when the voltage V23 is a negative value (i.e., V23<0 in S233), the charging ECU 200 determines that an open circuit failure is present in the transistor TR2 (S224, see FIG. 7(F)). The charging ECU 200 informs the repair technician or the user that an open circuit failure is present in the transistor TR2 (S250).

When the voltage V23 is 0V (i.e., V23=0 in S233), the charging ECU 200 determines that the transistor TR1 is normal (see FIG. 7(E)). In this case, the charging ECU 200 determines that the malfunction which prevents the power reception device 2 from receiving power successfully is present in the power transmission device 1 even though the inverter 12 of the power transmission device 1 is performing the power conversion operation normally (S240).

As described above, according to the second embodiment, when the relay circuit 24 is closed and the rectifier circuit 23 and the power storage device 25 are electrically connected, the short circuit command SC1 and the short circuit command SC2 are outputted sequentially. Then, the voltage V21 before the output of the short circuit commands SC1 and SC2 and the voltage V22 after the output of the short circuit command SC1 but before the output of the short circuit command SC2 are obtained and compared. Thereby, it is possible to determine whether or not an open circuit failure is present in the transistor TR1, a short circuit failure is present in the transistor TR1 or a short circuit failure is present in the transistor TR2. Further, by obtaining the voltage V23 after the output of the short circuit commands SC1 and SC2 and comparing the voltage V22 and the voltage V23, it is possible to determine whether or not an open circuit failure is present in the transistor TR2. By determining the malfunction spot in this manner, it is possible for a repair technician to perform the necessary repair immediately.

The embodiments and examples disclosed herein are illustrative and non-restrictive in any respect. The technical scope indicated by the claims is intended to include any modifications within the scope and meaning equivalent to the terms of the claims.

What is claimed is:

1. A power reception device configured to receive power in a wireless manner from a power transmission device configured to perform a power conversion operation, comprising:
    a first capacitor electrically connected between a first power line and a second power line connected respectively to both ends of a power reception coil that receives power from the power transmission device;
    a voltage sensor configured to detect a voltage of the first power line with respect to the second power line;
    a current sensor configured to detect a current flowing through one of the first power line and the second power line;
    a crowbar circuit including a diode bridge which is implemented by a first diode, a second diode, a third diode and a fourth diode as well as a first switching element and a second switching element, and configured to rectify the full wave of AC power between the first power line and the second power line and output the rectified AC power to a positive electrode line and a negative electrode line;
    a second capacitor electrically connected between the second power line and the negative electrode line; and a controller configured to output a first control signal for making the first switching element conductive and a second control signal for making the second switching element conductive, the first diode having an anode connected to the negative electrode line and a cathode connected to the first power line, the second diode having an anode connected to the negative electrode line and a cathode connected to the second power line, the third diode having an anode connected to the first power line and a cathode connected to the positive electrode line, the fourth diode having an anode connected to the second power line and a cathode connected to the positive electrode line, the first switching element being connected in parallel to the first diode, the second switching element being connected in parallel to the second diode, in the case where a detection value of the current sensor indicates that the power reception device is not receiving power normally even though the power conversion operation of the power transmission device is being performed, the controller being configured to output at least one of the first control signal and the second control signal to the crowbar circuit after stopping the power conversion operation of the power transmission device so as to determine whether or not a malfunction is present in the crowbar circuit based on a detection value of the voltage sensor.

2. The power reception device according to claim 1, further comprising:

a relay circuit which is connected between the crowbar circuit and a power storage device for storing electric power rectified by the crowbar circuit, and configured to be switched so as to electrically connect and disconnect the crowbar circuit and the power storage device, wherein when the crowbar circuit and the power storage device are electrically disconnected from each other by the relay circuit, the controller is configured to output the first control signal and the second control signal, and determine that a malfunction is present in the crowbar circuit when the detection value of the voltage sensor is a negative value.

3. The power reception device according to claim 2, wherein the controller is configured to determine that the malfunction in the crowbar circuit is an open circuit failure in both the second switching element and the second diode.

4. The power reception device according to claim 1, further comprising:

a relay circuit connected between the crowbar circuit and a power storage device for storing electric power rectified by the crowbar circuit, and configured to be switched so as to electrically connect and disconnect the crowbar circuit and the power storage device, wherein the controller is configured to:

obtain a first voltage and a second voltage when the crowbar circuit and the power storage device are electrically connected to each other by the relay circuit, the first voltage being a detection value of the voltage sensor under a condition that the first control signal and the second control signal are not outputted, the second voltage being a detection value of the voltage sensor under a condition that the first control signal is outputted and the second control signal is not outputted, and determine whether or not a malfunction is present in the crowbar circuit by comparing the first voltage and the second voltage.

5. The power reception device according to claim 4, wherein the controller is configured to:

determine whether the malfunction in the crowbar circuit is a first malfunction or a second malfunction based on the comparison result between the first voltage and the second voltage, the first malfunction is an open circuit failure in the first switching element and the first diode or a short circuit failure in at least one of the second switching element and the second diode, the second malfunction is a short circuit failure in at least one of the first switching element and the first diode.

6. The power reception device according to claim 4, wherein the controller is further configured to:

obtain a third voltage which is a detection value of the voltage sensor under a condition that both the first control signal and the second control signal are outputted, and determine whether a third malfunction is present or not by comparing the second voltage and the third voltage, the third malfunction is an open circuit failure in the second switching element and the second diode.

7. The power reception device according to claim 6, wherein the controller is configured to determine that a malfunction is present in the power transmission device when it is determined that none of the first malfunction, the second malfunction and the third malfunction is present in the power reception device.

8. The power reception device according to claim 1, wherein each of the first switching element and the second switching element is a MOSFET, and the first diode and the second diode are parasitic diodes of the first switching element and the second switching element, respectively.

9. A wireless power transmission system comprising:
the power transmission device; and
the power reception device according to claim 1.

* * * * *

UNITED STATES PATENT AND TRADEMARK OFFICE
CERTIFICATE OF CORRECTION

Page 1 of 1

PATENT NO. : 10,797,526 B2
APPLICATION NO. : 16/193631
DATED : October 6, 2020
INVENTOR(S) : Yoshinobu Sugiyama and Satoshi Taniguchi It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Toyota" and insert --Toyota-shi Aichi-ken--, therefor.

In the Specification

In Column 16, Line(s) 52, delete "V230V" and insert --V23=0V--, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*